United States Patent [19]

Hayes et al.

[11] Patent Number: 5,311,428
[45] Date of Patent: May 10, 1994

[54] REAL TIME FILTER FOR DATA PROCESSING

[75] Inventors: John M. Hayes, Macedonia; Matthew P. Grabnic, Maple Heights, both of Ohio

[73] Assignee: Summit World Trade Corporation, Hudson, Ohio

[21] Appl. No.: 893,778

[22] Filed: Jun. 5, 1992

[51] Int. Cl.$^5$ ............................................. G06F 15/00
[52] U.S. Cl. .......................... 364/413.13; 364/413.19; 364/413.22
[58] Field of Search ...................... 364/413.13, 413.22, 364/724.04, 724.02, 724.12; 382/6, 54

[56] References Cited

U.S. PATENT DOCUMENTS 4,590,582  5/1986  Umemura ............................ 364/724
4,674,045  6/1987  Kerber et al. ....................... 364/414

OTHER PUBLICATIONS

Cohen, Raines; "Concept VI"; MacWeek, Nov. 1990; p. 10.

*Primary Examiner*—Roy N. Envall, Jr.
*Assistant Examiner*—Ari M. Bai
*Attorney, Agent, or Firm*—Watts, Hoffmann, Fisher & Heinke

[57] ABSTRACT

Method and apparatus for imaging of a subject. Radiation intensity data is transformed to a frequency domain, filtered, retransformed and then backprojected to allow an operator to examine a cross sectional image of the subject. Based upon this image, a filter function is adjusted and a second image is presented. Further adjustments can be made in the filter function to fine tune the image. The filter adjustments are all rapidly performed with the aid of a pointing device that can easily and intuitively allow the user to adjust the filter function characteristics.

12 Claims, 5 Drawing Sheets

Fig.3B

| Help | Quit: ect |
|---|---|
| Utilities | Close |
| ■ Pre-Filter projections | Patient Select \| Save |
| | Isotope: \| none |
| | Complete Reconstruction |
| | Partial Reconstruction |
| | ☐ Attenuation Correction |
| | Free Angle Reconstruction |
| | Cine Raw Data |
| | Slice Range Setup |
| | Slice Reconstruction |
| | Attenuation Correction Setup |
| ■ Display Raw | Sagittal Coronal Setup |
| Projection | Zoom Setup |
| Pg+ Frm+ Scrl+ ☐ Rst ☐ Cine | Maximum Activity Projection |
| Pg− Frm− Scrl− ☐ Var ☐ Sel | Reprojection |
| Beg Frm 1  End Frm 64 | Sagittal Coronal Reformat |
| Dsp Interval 1 Sum Interval 1 | Reference Frame 1 |
| Mag 2 | Slice Thickness 1 |
| | Begin Slice 1  End Slice 64 |
| ☐ Cine \| BPM \| ☐ Bwd | X Center 32  Y Center 32 |
| Rate (frm/sec) 5 | BP Zoom 1.0  Matrix Zoom 1 |
| | Data Scale 1  BP Center 0.0 |
| | Attenuation Coefficient 0.000 |
| Sagittal | Filter \| butterworth |
| Pg+ Frm+ Scrl+ ☐ Rst ☐ Cine | |
| Pg− Frm− Scrl− ☐ Var ☐ Sel | |
| Beg Frm 40  End Frm 60 | |
| Dsp Interval 5 Sum Interval 5 | |
| Mag 5 | order 4 |
| ☐ Cine \| BPM \| ☐ Bwd | cutoff 0.35 |
| Rate (frm/sec) 5 | |
| | |
| Coronal | |
| Pg+ Frm+ Scrl+ ☐ Rst ☐ Cine | |
| Pg− Frm− Scrl− ☐ Var ☐ Sel | Invert stripe |
| Beg Frm 40  End Frm 60 | Stripe: \| rainbow \| 1 |
| Dsp Interval 5 Sum Interval 5 | Mode: \| Upper/Lower/Gamma 1 |
| Mag 5 | Steps: \| none \| Prescale: \| none |
| ☐ Cine \| BPM \| ☐ Bwd | lower 0  upper 240 |
| Rate (frm/sec) 5 | gamma 0.0 |

Fig. 3C

REAL TIME FILTER FOR DATA PROCESSING

TECHNICAL FIELD

The present invention relates to the field of reconstructive imaging and more particularly to a method of cross-sectional image reconstruction useful in nuclear imaging and other applications.

BACKGROUND ART

Medical imaging techniques such as nuclear imaging, computerized tomography ("CT") and nuclear magnetic resonance imaging ("NMR") generate two-dimensional images from cross-sectional scans of patients. In nuclear imaging, for example, the image is generated from measurements tracing the position or movement of a radioactive isotope administered to the patient. Since certain radioactive isotopes accumulate in certain organs, it is possible to study these organs through the selection of an appropriate isotope.

The position or movement of the isotope is monitored by sensing the radioactive output from the isotope. After the isotope has been administered, the patient is monitored by detectors which detect radiation intensity. Each detector within an array monitors radioactive output from the patient, producing a set of intensity readings in the time domain representing a cross-section of interest within the patient. The subject cross-sections are frequently taken transversely, that is, normal to the long axis of the patient, in order to simplify the radiation detection equipment.

Many commercially available imaging systems use a five step process to reconstruct cross-sectional images. Raw time-domain data is extracted, that is, input and formatted into data views. The data from each view is then converted to a frequency domain by means of a fast fourier transform ("FFT") or other technique. The frequency domain data is then "filtered" to remove "noise" and sharpen the image. The filtered data is then converted back into the time domain, as by an inverse fast fourier transform, and backprojected over a cross-section to form an image. "Filtering" is essentially a weighted averaging process, in which the frequency domain data is subjected to convolution integration with a kernel referred to as a "filter." The filter is a vector in the frequency domain which augments one or more bands of frequencies likely to be of interest and attenuates others. Preferred types of filters have been developed over the years under names such as Butterworth, Hamming, Metz and Wiener filters. While the type of filter determines generally the shape of the filter, the details of the shape of the filter are determined by numerical parameters. The mathematical relations defining these filter types are well-known and available in reference books.

Care must be exercised in the selection of the filter. Filtering with too strong a filter, that is, a filter which is weighted too heavily in favor of selected frequencies, will tend to blur the image. On the other hand, filtering with too weak a filter will lead to a "noisy" image. The operator must select a proper filter based on his or her experience with images produced with the available equipment.

The amount of time-domain data, and hence the length of the frequency-domain data lines, is dependent on the actual size of the cross-sections and the structure of the array of radiation detectors. Different conditions may give rise to time-domain data sets, and hence frequency-domain data lines, of different length. As the length of the frequency-domain data lines varies, the filter must be adapted in order to discriminate between the frequencies of interest and those attributable to "noise."

Typical prior art systems offer a library of pre-defined filter functions for use within the reconstruction. A filter is selected prior to reconstruction and used throughout that processing session. If the pre-defined filter does not yield an image of the desired clarity, the operator must either select a different pre-defined filter or create a new one. Selection of a different pre-defined filter can be accomplished within the reconstruction application, but typically filter creation is a separate program and must be performed outside the reconstruction application. As a consequence, the image cannot be "fine-tuned" within the application to produce the desired image quality.

DISCLOSURE OF THE INVENTION

One embodiment of the invention is a method for reconstructive imaging of a subject cross-section particularly suited for use in connection with medical radiological processes such as nuclear imaging. Time-domain data, preferably in the form of radiation intensity readings gathered by one or more detectors near the subject cross-section, is obtained and formatted into data views. These time-domain data views are then converted into frequency-domain data by means of a one-dimensional fast-fourier transform (FFT) or similar process.

A filter type is selected from a menu of filter types and assigned a set of initially-defined parameters. A filter generation subroutine then generates a filter of the selected type using the initially-defined parameters. In accordance with the invention, a visual depiction of the initial filter is then displayed for reference by the operator. In a preferred embodiment, the amount of the data gathered is also provided to the filter generator so that the filter is automatically adapted for differently-sized data sets.

The frequency-domain data lines are then filtered by convolution integration with the initial filter. The filtered data lines are converted back to time-domain and backprojected to produce an initial display corresponding to the subject cross-section. This display as well as the plot of the initial filter are made available to the operator for guidance in "fine-tuning" the image.

The operator then alters one or more parameters of the filter in order to define a new filter of the same type as the initial filter. In a preferred embodiment, one of the parameters is selected and a slider control is moved to continuously vary the selected parameter. As the parameters are varied, the filter generator generates an updated filter using the altered parameters. This updated filter, in turn, is used to refilter the frequency-domain data lines. The refiltered data lines are then converted back into the time domain and backprojected to display an updated image which, along with a plot of the updated filter, provides additional guidance for "fine-tuning" the image.

According to another embodiment of the invention, data obtained from a plurality of parallel subject cross-sections is pre-filtered to "fine-tune" images normal or oblique to the subject cross-sections. Time-domain data, again preferably in the form of data gathered by radiation detectors, is obtained and formatted into data views. These time-domain data views are then converted into frequency-domain data and, in a preferred embodiment, the amount of the data is determined. Unlike the two-dimensional process listed above, these data views are then recombined in two-dimensional data arrays corresponding to cross-sections normal to the subject cross-sections. These cross-sections are then converted to frequency-domain data arrays by means of a two-dimensional FFT or similar process.

A first one-dimensional filter type for use in pre-filtering the data is selected from a menu of filter types and assigned a set of initially-defined parameters. A filter generation subroutine then generates a filter of the selected type using the initially-defined parameters. In a preferred mode, a plot of the initial pre-filter is then displayed for reference by the operator. In a preferred embodiment, the length of the data line is provided to the filter generator so that the pre-filter is automatically adapted for differently-sized data sets.

The frequency-domain data arrays are then filtered by convolution integration with the initial filter in a plane normal to the subject cross-sections. While the data is not formatted in the form of spacially-defined data lines prior to filtering, data array in the two-dimensional frequency domain naturally decomposes into data lines defined by the frequency spectrum in the unique direction in each array parallel to the subject cross-sections. The filtered data arrays are then converted to data lines in the frequency domain for one-dimensional filtering within subject cross-sections as described previously.

A second one-dimensional filter type is selected from a menu of filter types and assigned a set of initially-defined parameters. A filter generation subroutine then generates a filter of the selected type using the initially-defined parameters. In a preferred mode, a plot of the initial filter is then displayed for reference by the operator. In a preferred embodiment, the length of the data line is provided to the filter generator so that the filter is automatically adapted for differently-sized data sets.

The frequency-domain data lines are then filtered by convolution integration with the initial filter. The filtered data lines are converted back to time-domain and backprojected to produce an initial display corresponding to the subject cross-section. An image in a plane normal to the subject cross-sections is also backprojected and displayed. These displays as well as the plots of the initial pre-filter and filter are made available to the operator for guidance in "fine-tuning" the image.

The operator then alters one or more parameters of the pre-filter and filter in order to define a new filter of the same type as the initial filter. In a preferred embodiment, one of the parameters is selected and a slider control is moved to continuously vary the selected parameter. As the parameters are varied, the filter generators generate either an updated pre-filter, an updated filter or both using the altered parameters. This updated pre-filter and filter, in turn, are used to refilter the image. The refiltered data lines are then converted back into the time domain and backprojected to display updated images which, along with a plots of the updated pre-filter and filter, provide additional guidance for "fine-tuning" the image.

The method permits fine-tuning of the image by means of adjusting the filter "on-the-fly" rather than in a separate program. In a preferred embodiment, the backprojected images are continuously updated while the pre-filter or filter parameters are continuously varied by means of a slider control, whereby the operator can "fine-tune" the image by means of a sliding movement rather than by repetitious keyboard entries. The same reconstruction system may be adapted to different camera arrays because the filter is adapted automatically for data lines of different lengths. Furthermore, the use of "on-the-fly" filter adjustment vastly simplifies the problem of filtering in two dimensions to obtain images in planes normal or oblique to the subject cross-sections. These and other advantages of the invention will become clearer from the drawings and following detailed description of the preferred embodiment.

BRIEF DESCRIPTION OF THE DRAWINGS

FIGS. 3B and 3C are schematic diagrams showing right side portions of the preferred display format.

DETAILED DESCRIPTION OF THE PREFERRED EMBODIMENT

Figure 1:
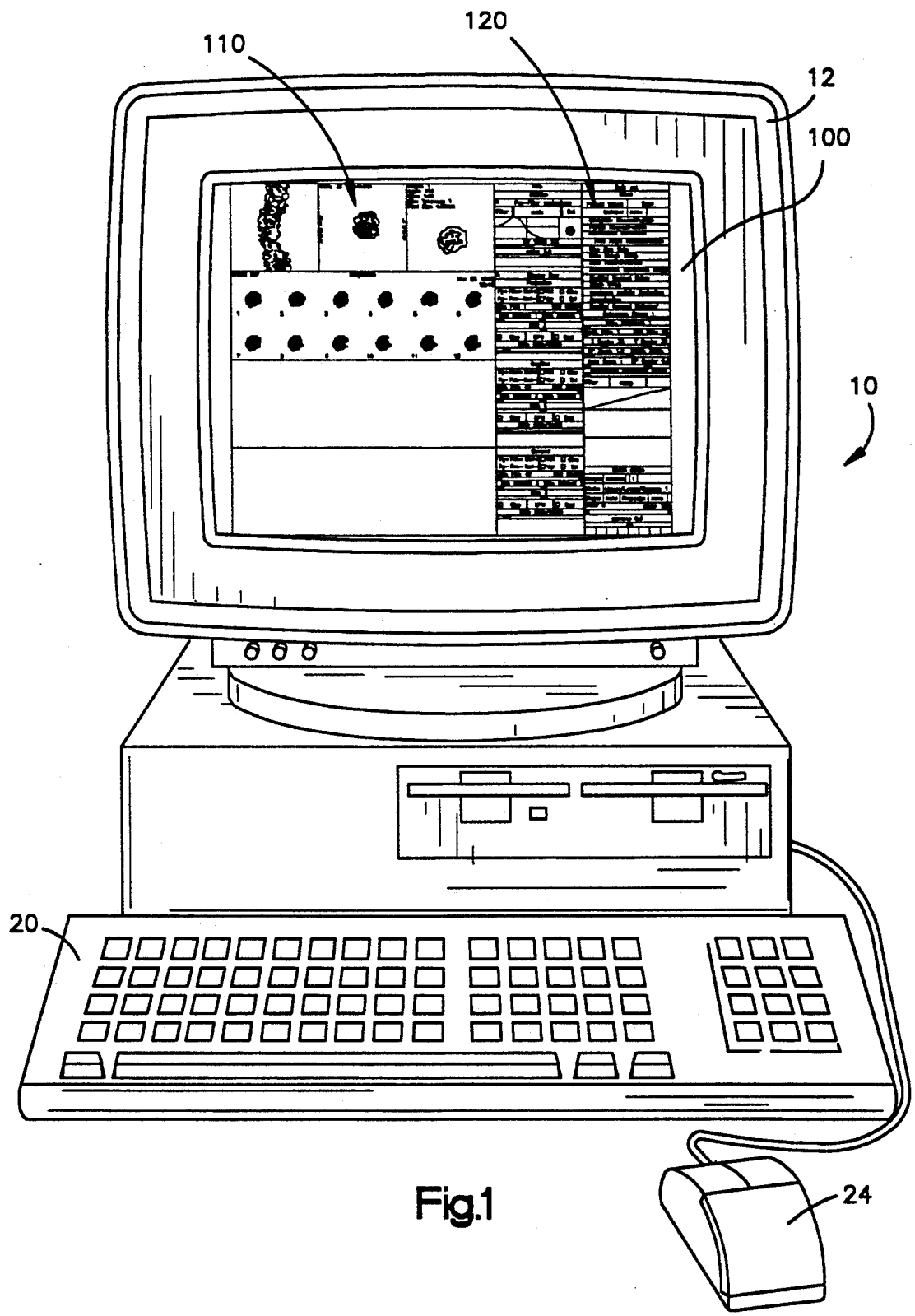
FIG. 1 is a schematic of a computer system for use in displaying a representation of the internal structure of a subject.

Turning now to the drawings, FIG. 1 discloses a workstation 10 for displaying a cross-section representation of the internal structure of a subject. The workstation 10 includes its own central processing unit which preferably comprises a RISC-system based centrally processing unit. One example of such a workstation is a RISC system/6000 workstation commercially available from International Business Machines. The RISC system/6000 workstation includes a central processing unit, memory and means for transmitting and receiving data. A video display portion of the workstation presents an image on a viewing screen 12 and disk drives allow data to be stored in a relatively permanent form for access. The workstation also includes a communications interface for communicating data from other sites such as a data gathering computer or dedicated processor of a nuclear imaging system (not shown).

As is well known in the art, a nuclear image system includes detectors for gathering radiation intensity data from radiation either within a subject or patient or from a source that moves with respect to the subject or patient. As the intensity readings are gathered by the detectors, they are organized according to views at various angles with respect to a reference orientation. Multiple views are gathered and stored within the data processing unit of the nuclear imaging system. These views can then be transmitted to the workstation 10 for the data processing.

A keyboard 20 coupled to the workstation 10 allows an operator to enter commands into the workstation for controlling the manner in which data is displayed on the viewing screen 12. A movable pointing device 24, popularly referred to as a mouse, is also coupled to the workstation by a serial cable. By sliding the pointing device across the flat surface of a work area and clicking a mouse button, the operator can also enter commands and make changes to the manner in which the image is displayed on the viewing screen 12.

Figure 3A:
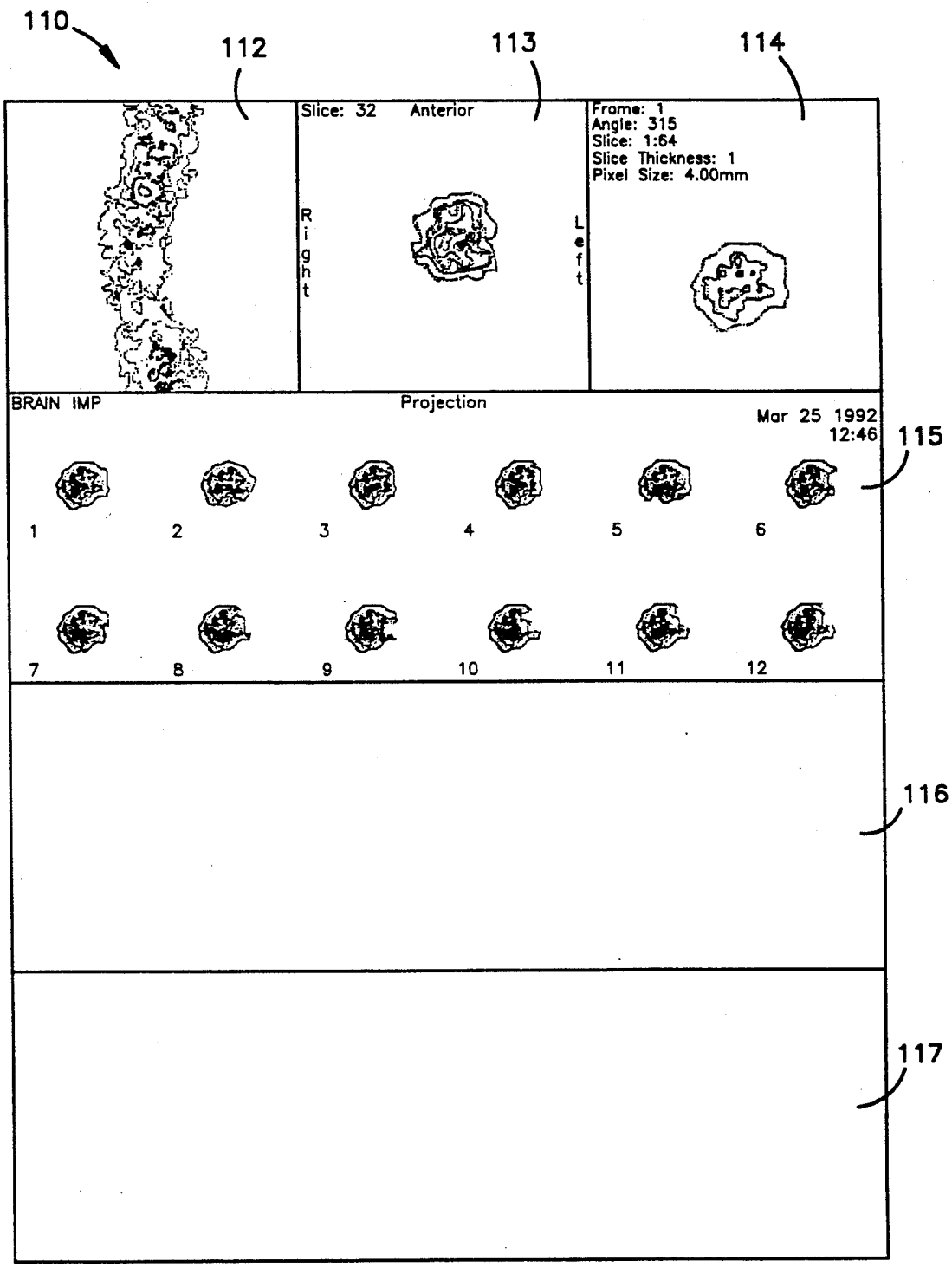
FIG. 3A is a schematic diagram showing a left side portion of a preferred display formats for use in connection with the FIG. 1 computer system.
Figure 3B:
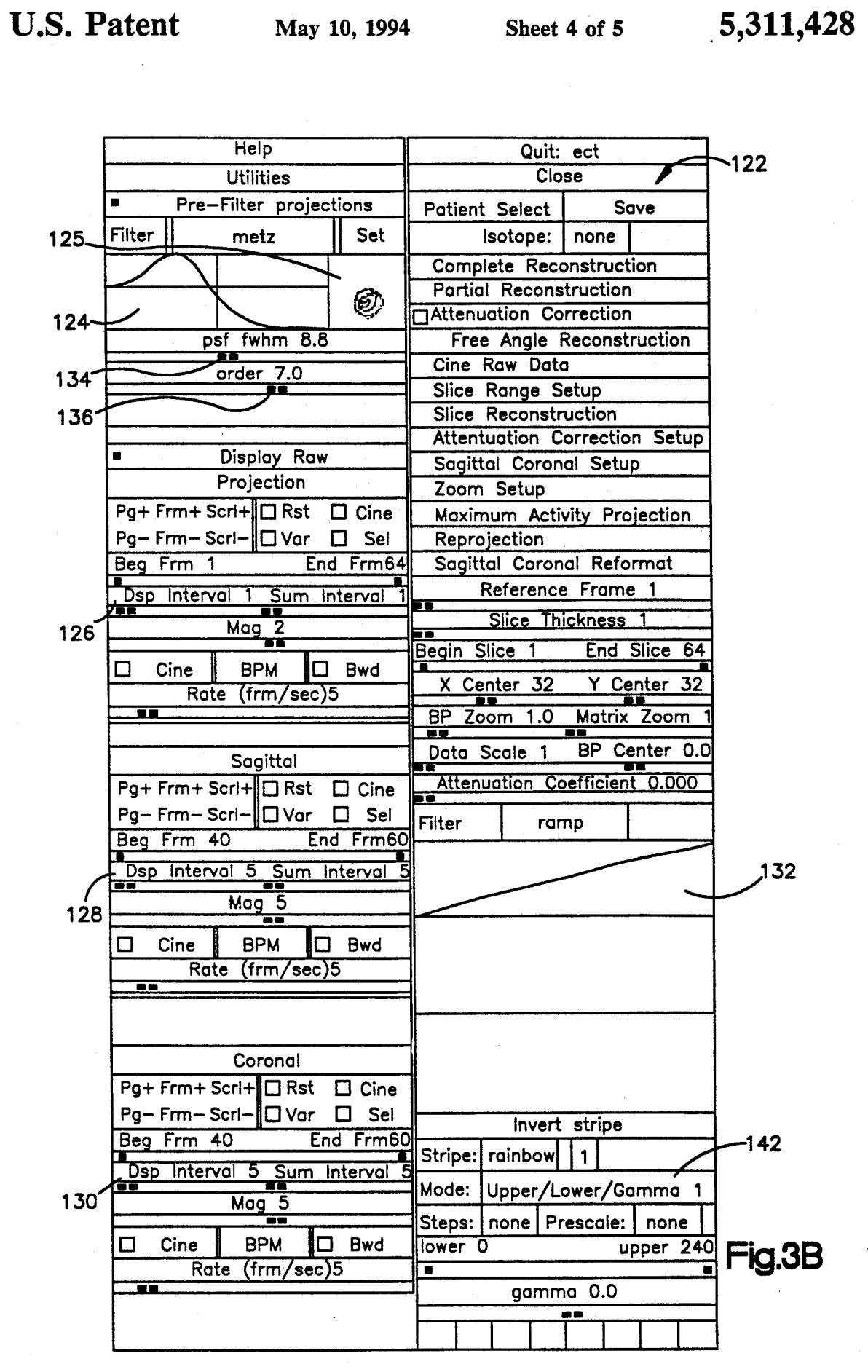

FIGS. 3A and 3B are enlarged views of a representative display 100 on the screen 12. FIG. 3A would appear on the left side of a CRT screen or printout of the display, while FIG. 3B would appear on the right side of the display. Such a display would allow the operator of the diagnostic imaging system to enter commands and control the cross-sectional representation of the internal structure of a subject. As noted, a principle goal of the display is to present a clear image of the internal structure of the subject that is neither blurred due to an over-filtering nor noisy due to lack of filtering.

The display 100 includes two portions or segments 110, 120. A leftmost segment 110 (FIG. 3A) displays cross sectional representations of the subject. The leftmost segment 110 is divided into six panels 112-117. The panels 112-115 display different views from data gathered by a nuclear imaging system. The panel 115 shows multiple cross sections arranged parallel to each other and spaced apart by a thickness of 1 slice. The enlarged depiction shown in panel 114 is the first such view.

The right display segment 120, 120' (FIGS. 3B, 3C) is an input and control area of the display. The uppermost portion 122, 122' of the display segment 120, 120' provides a menu for such software functions as "HELP," "QUIT" and "SAVE." Immediately below this portion 122, 122' in the left-hand column of the display segment 120, 120' is a pre-filter window 124 in which a pre-filter function is displayed. (This window may be blank as at 124' in FIG. 3C when no pre-filtering is desired.) Next to the window 124 is a window 125 in which an updating image is displayed. Below the window 124, 124' are menus 126, 128, 130, 126', 128' 130' for enabling the display of either projection (transverse), sagittal, coronal, oblique or free angle views and for manipulating the display format.

In the lower left-hand column of the right display segment 120, 120' is a window 132, 132' for displaying the filter. Below each of the windows 124, 132' (when in use) are sliders (134, 136 shown below window 124 in FIG. 3B; 138, 140 below window 132 in FIG. 3C) for adjusting the filter parameters. At the bottom of the left-hand column of the display segment 120, 120' is a section 142, 142' for controlling the color scheme used to indicate greater or lesser intensity of radiation emanating from different portions of the subject.

By moving a pointer back and forth across this portion of the display and then clicking a mouse button, the various attributes of the display are adjusted and controlled. In the illustration of FIG. 3B, a ramp filter has been chosen to filter data that has been transformed from the time domain to the frequency domain. The step of applying this filter to that transformed data is one of multiplying the transformed data point by point by the filter based upon the frequency of the transformed data. Stated another way, data is stored according to views after it is obtained from the radiation detection system and then transformed into the frequency domain and assigned values based upon the transformation. The transformed data is then multiplied by the value of the filter function for that data's frequency.

The process of fine tuning the images involves user or operator intervention to adjust the characteristics of the filter accompanied by rapid updating of the images on the left portion 110 of the display. The shape of the filter, displayed in window 132, 132' can be modified by using the cursor to activate a control function for keying in new parameter values. The new values are used to rapidly generate a filter function for filtering the transformed data. The shape of the filter can also be fine tuned by adjustment of a slider 138, 140 (FIG. 3C) directly below the graphical depiction of the filter. (In the case of a ramp filter such as that displayed in FIG. 3B at 132, the shape of the filter is fixed so that no slider appears beneath the window.) The particular generic class of filters can also be rapidly updated using the interaction between operator, mouse and display. Thus, the ramp filter (FIG. 3B) could be replaced by a butterworth filter (FIG. 3C) or the like, and the various characteristics of that filter could also be adjusted in real time.

Figure 2:
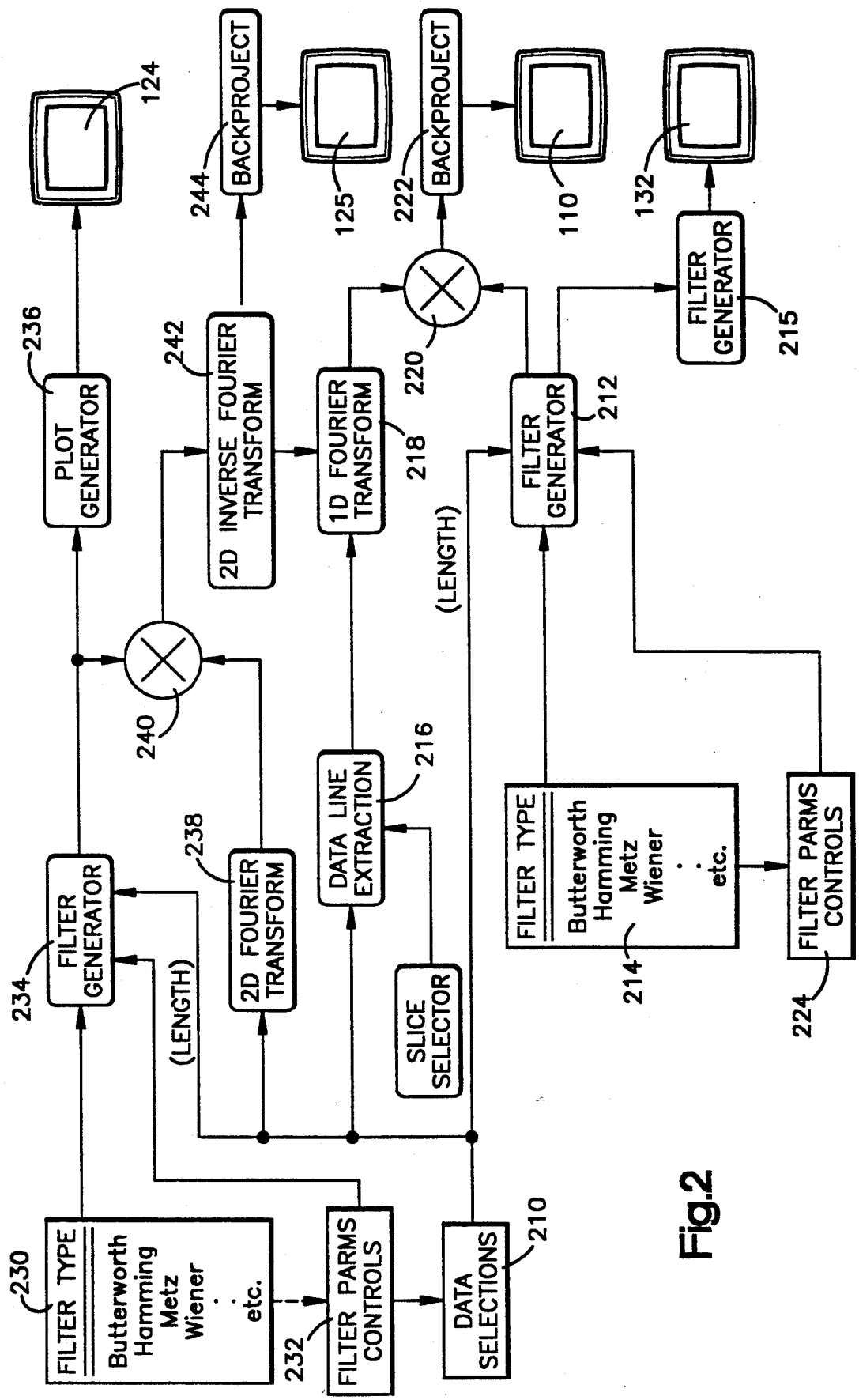
FIG. 2 is a flow-chart illustrating a preferred embodiment of a method for reconstruction imaging.

FIG. 2 is a flow chart depicting the algorithm that the central processing unit of the workstation executes to allow the operator to fine tune the cross sectional representations. A block 210 labeled "Data Selections" indicates that the radiation intensity data has been gathered and organized according to views of parallel sets of data having a certain size or length. This length is an input into a filter generator 212 which, in conjunction with a user accessed input, creates a filter function based upon a menu or listing of known filters. Sample filter types are listed at a block 214. The combination of a predefined filter from the block 214 and the length of the data view is combined by the filter generator to create a filter function to be applied to the data. The filter is plotted, as at 215, and displayed in the window 132 on the display portion 120.

At block 216 data from the data store area 210 is extracted from memory and a one-dimensional Fourier transform 218 is performed on the data. The predefined filter function from the filter generator 212 is applied to the frequency-domain data at a step 220. The data is then retransformed and backprojected 222 for display on the video display 110. The operator then views the representative cross sectional image of the subject (FIG. 3A) and by means of the mouse and keyboard, adjusts the filter parameters at a step 224. This is accomplished by altering the filter parameters displayed on the right-hand portion 120 of the display 100. The filter generator 112 rapidly re-adjusts the filter parameters and refilters the data, and applies it to the filtering step 220. As soon as the filtering is accomplished, retransformation and backprojection is accomplished, and an updated display obtained. Once the operator is satisfied with the images presented on the left-hand portion 110 of the display 100, the data representing these cross sections can be stored or printed for further evaluation.

One drawback to filtering in one direction within parallel cuts of the subject (such as the transverse cuts displayed at 115 in FIG. 3) is that a reconstructed image of a section normal or oblique to those cuts (such as the free angle image shown at 112 in FIG. 3) may not be clear. In order to improve the clarity of such sectional images, a two-dimensional pre-filtering step is provided. In a preferred embodiment, this two-dimensional filter varies in a dimension perpendicular to the parallel cuts and is constant (i.e., non-filtering) in a dimension within the parallel cuts. As shown at the upper left-hand portion of FIG. 2, the shape of the projection of the filter normal to the parallel cuts is selected at a step 230. Default parameters for the selected filter projection shape are selected at a step 232. As described previously, data is gathered and organized at step 210 according to views of parallel sets of data having a certain size or length. This length is forwarded to a filter generator 234, which generates a filter of the selected shape appropriate for a data set of the length supplied in step 210. A plot of the projection of this filter normal to the parallel cuts is generated at step 236 and displayed in the window 124.

At step 238, the data sets gathered during the data selection step 210 are converted into frequency domain data sets by means of a two-dimensional Fourier transform. This frequency-domain data set is multiplied point by point by the filter at step 240, thereby pre-filtering the frequency-domain data set in a direction perpendicular to the parallel cuts. This pre-filtered data is then reconverted into the time domain by means of an inverse Fourier transform at step 242. The reconverted time domain data may then be used to reconstruct an image at steps 212, 214, 218, 220 and 222 described previously in connection with data which was not pre-filtered. An image of a section normal or oblique to the parallel cuts is backprojected at 244 and displayed in the window 125, to permit the operator to monitor the quality of the image and adjust the pre-filter (e.g. by means of the sliders 134, 136 or by keying in new values of the pre-filter parameters) and filter to improve the quality.

The present invention has been described with a degree of particularity. It is the intent, however, that the invention include all modifications and alterations from the disclosed design falling within the spirit or scope of the appended claims.

We claim:

1. A method for programmable processing reconstructive imaging of a cross-section region of interest within a subject comprising the steps of:
   a) obtaining a time-domain intensity data set from an internal region of interest within the subject;
   b) converting the time-domain intensity data set to an unfiltered frequency-domain data set;
   c) selecting one filter type from a set of filter types and assigning a set of filter parameters;
   d) generating a first filter using the selected filter type and the set of filter parameters;
   e) displaying a visual depiction of the first filter, the visual depiction generated using the set of filter parameters and concurrently;
      i) using the first filter to filter the unfiltered frequency-domain data set to obtain a first filtered frequency-domain data set;
      ii) reconverting the first filtered frequency-domain data set to a first filtered time-domain data set; and
      iii) backprojecting the first filtered time-domain data set to display an image representing the region of interest;
   f) revising the set of filter parameters by altering at least one of the filter parameters based on the displayed image of the region of interest;
   g) generating an altered filter using the selected filter type and the revised set of filter parameters;
   h) displaying a visual depiction of the altered filter, the visual depiction generated using the revised set of filter parameters and concurrently;
      i) using the altered filter to filter the unfiltered frequency-domain data set to obtain a revised filtered frequency-domain data set;
      ii) reconverting the revised frequency-domain data set to a revised time-domain data set; and
      iii) backprojecting the revised set of filtered time-domain data to display an image representing the region of interest.

2. A method according to claim 1 wherein the step of obtaining the time-domain intensity data set from the internal region of interest includes the step of impinging radiation on at least one detector near the cross-section region of interest and recording the signals output by the at least one detector.

3. A method according to claim 1 wherein the steps f) through h) are repeated until a satisfactory image of the region of interest is displayed.

4. A method according to claim 1 including the steps of determining the size of the time-domain data set and altering the generated filter to compensate for time-domain data sets with different sizes.

5. A method according to claim 1 wherein the step of alter the filter parameters is performed by selecting one of the parameters, moving a slider control to continuously alter the value of said one parameter and updating the visual depiction of the altered filter and the displayed image of the subject region of interest as the one parameter is altered.

6. A method for programmable processing three-dimensional reconstructive imaging comprising the steps of:
   a) obtaining a time-domain data set from a series of parallel subject cross-sections from a region of interest;
   b) formatting the time-domain data into time-domain data lines defining planar time-domain data arrays taken along planes normal to the subject cross-sections;
   c) converting the planar time-domain data arrays to unfiltered frequency-domain data arrays;
   d) selecting a filter type from a set of filter types and defining a set of filter parameters for the selected filter type;
   e) generating a first filter using the selected filter type and the set of filter parameters;
   f) displaying a visual depiction of the first filter, the visual depiction generated using the set of filter parameters and concurrently;
      i) using the first filter to filter each of the unfiltered frequency-domain data arrays to obtain a first set of filtered frequency-domain data arrays;
      ii) reconverting the set of filtered frequency-domain data arrays to a first set of filtered time-domain data; and,
      iii) backprojecting the first set of filtered time-domain data to display an image representing the region of interest;
   g) altering at least one of the filter parameters based on the first image thereby creating a revised set of filter parameters;
   h) generating an altered filter using the selected filter type and the revised set of filter parameters;
   i) displaying a visual depiction of the altered filter, the visual depiction generated using the revised set of filter parameters and concurrently;
      i) using the altered filter to filter each of the unfiltered frequency-domain data arrays to obtain a revised set of filtered frequency-domain data arrays;
      ii) reconverting the set of filtered frequency-domain data arrays to a set of filtered time-domain data; and
      iii) backprojecting the revised set of time-domain data to display an image representing the region of interest.

7. A method according to claim 6 wherein the step of obtaining the time-domain data set includes the step of impinging radiation on one or more detectors near the subject region of interest and recording the signals output by the detectors.

8. A method according to claim 6 including the steps of determining the size of the time-domain data set and altering the generated filter to compensate for time-domain data sets with different sizes.

9. A method according to claim 6 wherein the step of altering the filter parameters is performed by selecting one of the parameters, moving a slider control to continuously alter the value of said one parameter and updating the visual depiction of the altered filter and the displayed image of the region of interest as the one parameter is altered.

10. A method according to claim 6 including the additional steps of backprojecting one array from the set of filtered frequency-domain data arrays to display an image representing a cross-section normal or oblique to the subject cross-sections from the region of interest.

11. A method for programmable processing displaying an image of an internal region of interest a subject derived from radiation impinging upon one or more detectors where the radiation is converted to unfiltered data representing the internal region of interest of the subject and further wherein to create an image of the internal region of interest the data is transformed, filtered and then again transformed over an array of picture elements, the improvement comprising the steps of:
 a) depicting a filter function on a viewing screen, the filter function generated using a selected filter type chosen from a set of filter types and a defined set of filter parameters and concurrently using said filter function to filter the unfiltered data representing the region of interest and displaying an image of the region of interest;
 b) altering the filter function based on the displayed image by using a pointing device to modify at least one of the filter parameters;
 c) depicting the altered filter function on a viewing screen and concurrently using said altered filter function to filter the unfiltered data representing the region of interest and displaying a revised image of the region of interest on the viewing screen; and,
 d) repeating steps b) and c) until a satisfactory image of the region of interest is displayed on the viewing screen.

12. Programmable processor apparatus for reconstructive imaging of a subject comprising:
 a) means for obtaining a time-domain data set from a subject region of interest;
 b) means for converting the time-domain data set to an unfiltered frequency-domain data set;
 c) means for selecting one filter type and assigning an initial set of filter parameters;
 d) means for generating a first filter of the one filter type using the set of initially assigned filter parameters;
 e) means for displaying a visual depiction of the first filter, the visual depiction generated using the set of initially assigned filter parameters and means for concurrently;
  i) using the first filter to filter the unfiltered frequency-domain data set to obtain a first filtered frequency-domain data set;
  ii) reconverting the first filtered frequency-domain data set to a first filtered time-domain data set; and,
  iii) backprojecting the first filtered time-domain data set to display a first image representing the subject region of interest.
 f) means for revising the set of filter parameters by altering at least one of the filter parameters based on the displayed image;
 g) means for generating an altered filter using the selected filter type and an revised set of filter parameters;
 h) means for displaying a visual depiction of the altered filter, the visual depiction generated by using the set of altered filter parameters and means for concurrently;
  i) using the altered filter to filter the unfiltered frequency-domain data set to obtain a revised filtered frequency-domain data set;
  ii) reconverting the revised filtered frequency-domain data set to a revised filtered time-domain data set; and
  iii) backprojecting the revised set of filtered time-domain data lines to display a revised image representing the subject region of interest.

* * * * *